United States Patent [19]

Stockton, Jr.

[11] 3,937,359

[45] Feb. 10, 1976

[54] VARIABLE VENT COVER FOR COOKING VESSELS

[76] Inventor: Archibald Dicks Stockton, Jr., 3868 S. Lake Drive, Roanoke, Va. 24018

[22] Filed: May 6, 1975

[21] Appl. No.: 574,978

Related U.S. Application Data

[63] Continuation-in-part of Ser. No. 334,662, Feb. 21, 1973, abandoned.

[52] U.S. Cl. .................................. 220/369; 126/384
[51] Int. Cl.² ............................................ A47J 27/34
[58] Field of Search .......... 220/256, 287, 367, 368, 220/369, 371, 374; 126/299 C, 381, 384; 215/307, 308, 310

[56] References Cited
UNITED STATES PATENTS

| | | | |
|---|---|---|---|
| 626,808 | 6/1899 | Gurney | 220/369 |
| 934,991 | 9/1909 | Buehl | 126/384 |
| 1,468,908 | 9/1923 | Kraft | 126/384 X |
| 1,549,412 | 8/1925 | Greenwalt | 220/369 |
| 2,510,196 | 6/1950 | Willette | 220/369 |
| 2,609,960 | 9/1952 | Irwin | 220/369 |
| 2,751,901 | 6/1956 | Livermore | 126/384 |

FOREIGN PATENTS OR APPLICATIONS 525,021    9/1921    France .............................. 220/371

*Primary Examiner*—William Price
*Assistant Examiner*—Stephen Marcus
*Attorney, Agent, or Firm*—Wilkinson, Mawhinney & Theibault

[57] ABSTRACT

The present disclosure is directed to a variable vent cover for cooking vessels and comprises a bottom cover having an opening therethrough and a pair of upstanding outwardly divergent flanges diametrically opposed and spaced about the periphery thereof which cooperates with downwardly convergent flanges diametrically opposed and spaced about the periphery of a top cover with a minimum of clearance between the flanges on the bottom and top covers so that they can be rotated horizontally relative to one another to vary the vent opening between the flanges to communicate the opening in the bottom cover with atmosphere and which will assure that both covers will interlock to be vertically lifted simultaneously for placement onto or removal from a cooking vessel.

5 Claims, 4 Drawing Figures

VARIABLE VENT COVER FOR COOKING VESSELS

This application is a continuation-in-part of my application Ser. No. 334,662, filed Feb. 21, 1973, now abandoned.

An object of the present invention is to provide a cover useable over a wide range of cooking pans and pots not requiring precise registry with the circumference thereof and which allows the food to cook while retaining the essence and flavor while preventing any splatter from escaping onto the stove or surrounding environment.

A further object of the present invention is the provision of a cooking vessel cover having two relatively horizontally rotatable members with cooperating peripheral flanges which when rotated horizontally permit varying the vent to atmosphere which cooperates with an opening in the bottom member to regulate pressure and temperature in the cooking vessel and which can be vertically lifted for removal from the vessel without separation of the two horizontally rotatable members.

A still further object of the present invention is the provision of a cooking vessel cover having only two moving parts which may be quickly separated for cleaning and sanitary use without requiring the conventional hinges, springs, rolled lips or small crevices which trap dirt, germs and resist complete cleaning usually attendant with plural cover members.

With the foregoing and other objects in view the invention will be more fully described hereinafter and more particularly pointed out in the appended claims.

In the drawings in which like parts are denoted by reference characters throughout the several views.

BRIEF DESCRIPTION OF THE INVENTION

Figure 1:
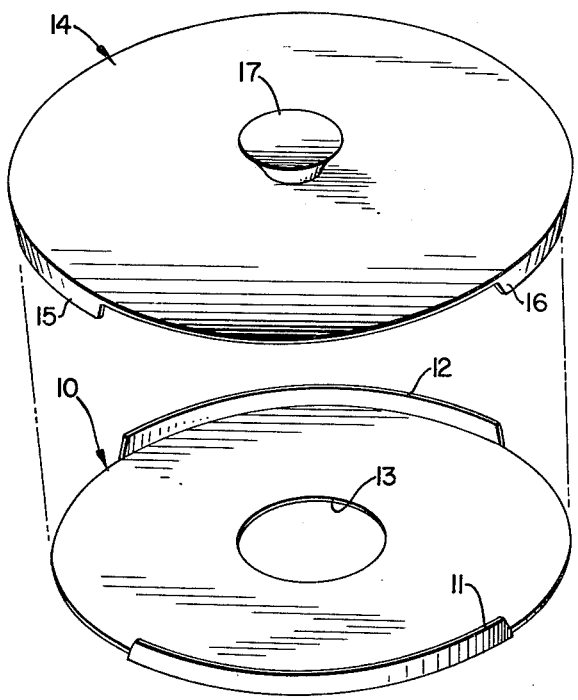
FIG. 1 is an exploded perspective view of the top and bottom cover members as they relate to each other.

The present invention as shown in the drawings is made of two round plates designated as a first cover member and a second cover member. The first cover has an opening in the approximate center. The second cover member does not have an opening in center. The second cover member has a knob in approximate center. Both cover members have quarter flanges on opposite sides of their circumferences. Flanges on the first cover member taper outward away from the center while the flanges on the second cover member taper inward toward center. The top and bottom cover members fit together and the flanges interlock, thus allowing both to be picked up by use of heat-resisting knob on top plate. There is enough clearance between flanges on each cover member to allow the two to rotate freely, thus making the two ports larger or smaller as desired. This variable vent cover rests on top of any average size cooking vessel and allows ventilation to food being cooked and also prevents any spatter from escaping onto stove, walls, floors or persons engaged in cooking.

Referring now to the drawings and for the moment to FIG. 1, the bottom or first cover member 10 is of circular disc-like form having two partial flanges 11, 12 diametrically opposed about the circumference of the member 10. These flanges are upwardly slightly divergent outwardly from the center, and extend over slightly less than one-quarter of the circumference of the disc 10. There is an opening or hole 13 in the first cover member.

Figure 3:
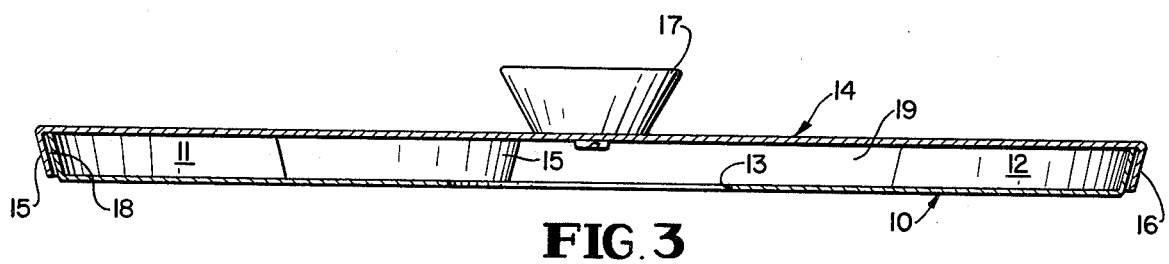
FIG. 3 is a longitudinal cross-section taken aong lines 3—3 of FIG. 2 showing the flanges of both cover members connected ready for lifting as a unit and forming an air vent of the desired size.

The top or second cover member 14 is of a complemental geometric form to the first cover member and has two partial flanges 15, 16 diametrically opposed about the circumference of the member 14. These flanges are downwardly convergent slightly as best seen in FIG. 3 inwardly toward the center and extend over slightly less than one-quarter of the circumference of the member 14. A lifting knob 17 is provided approximate in the center of the cover member 14.

Figure 2:
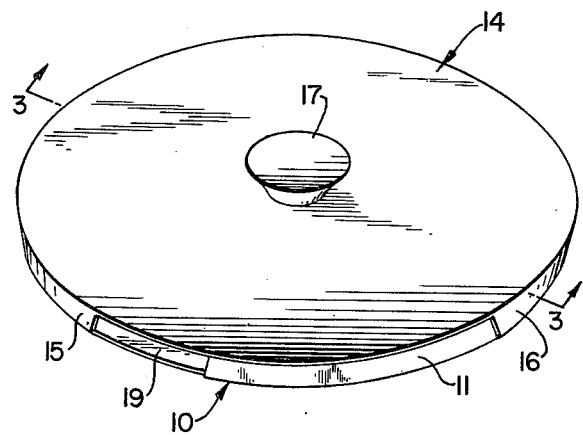
FIG. 2 is a perspective view of the cover parts connected, with an air vent formed by the interconnection flanges.

The two cover members 10 and 14, are placed together as shown in FIG. 2 first by positioning the flanges 11, 12 and 15, 16 ninety degrees apart, then rotating the two cover members 10 and 14 one-quarter turn allowing the two covers to mesh thus allowing cover 14 to pick up cover 10 using lifting knob 17.

Figure 4:
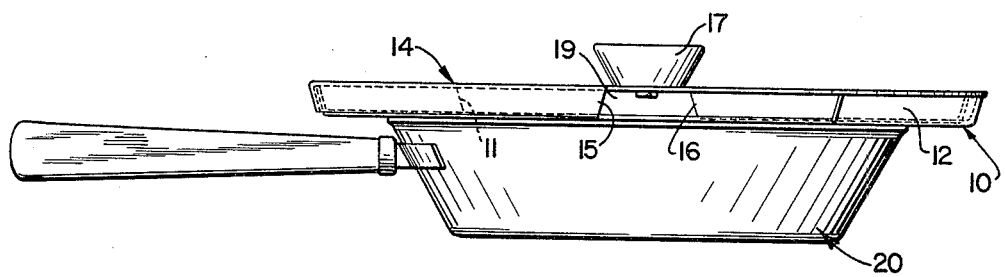
FIG. 4 is a side elevation of the cover mounted on a typical cooking vessel in use as a splatter shield with a vent opening.

There is a slight clearance 18, shown in FIG. 3, between flanges 11, 12 and 15, 16 which permits the two cover members 10 and 14 to rotate and adjust the two ports 19, shown in FIGS. 2 and 4, larger or smaller as desired. The two cover members 10 and 14 are used on any average size cooking vessel 20 as shown in FIG. 4.

Due to the design of the ports or vents 19 there is no dripping of moisture or food juices over the sides of the main cooking vessel 20 while food is being cooked; also, no spatter escapes through the ports 19 during cooking.

The improved cooking vessel cover device has been tested for cooking a variety of foods and the results have been outstanding. Chicken fried under this controlled cover turns out to be extremely appealing, crisp and golden brown with moisture and essence retained and flavor delicious. The same results were obtained with fried hamburgers, fried potatoes, fried apples, fried fish and fried oysters. Excellent results were obtained cooking roasts and casseroles in oven by placing the vessel cover on top of the cooking vessel and no boil-over occurred and no spatter reached interior of oven. The improved cover can be made of any suitable material; however I have found heavy sheet aluminum to be a most satisfactory material which conducts heat or cold and creates a condensing effect. The longevity and durability of the variable vent cover should be most satisfactory, even with constant heavy useage there should practically be no wear-out to this product.

What I claim is:

1. For use with a cooking vessel, a variable vent cover for said vessel comprising:
    a. a first cover member having an opening therethrough,
    b. at least two upstanding flanges spaced circumferentially about said cover and upstanding therefrom,
    c. a second cover member,
    d. at least two depending flanges spaced circumferentially about said second cover member,
    e. said upstanding flanges of said first cover engageable with said depending flanges of said second cover member and being circumferentially rotatable relative thereto to define a variable area vent between said upstanding and depending flanges to regulate and vent to atmosphere from within a cooking vessel through the opening in said first cover member.

2. A cover for a cooking vessel as claimed in claim 1 wherein said upstanding flanges on said first cover member are upwardly and outwardly divergent.

3. A cover for cooking vessels as claimed in claim 2 wherein said depending flanges on said second cover member are downwardly convergent to engage with said flanges on said first cover member to lock said cover members as a unit for vertically removing the variable vent cover from the cooking vessel.

4. A cover for cooking vessels as claimed in claim 3 wherein there are two upstanding flanges on said first cover member and two depending flanges on said second cover member.

5. A cover as claimed in claim 4 further comprising cover lifting means on top of said second cover member for lifting in interlocked relationship both said first and second cover members from said cooking vessel.

* * * * *